United States Patent
Kanechika et al.

(10) Patent No.: US 7,960,915 B2
(45) Date of Patent: Jun. 14, 2011

(54) CEMENT FOR BONDING AN ALUMINUM NITRIDE ARC TUBE BODY TO A MOLYBDENUM ELECTRODE SUPPORT, ARTICLES MADE THEREFROM, AND METHODS FOR MAKING SAME

(75) Inventors: Yukihiro Kanechika, Shunan (JP); Masanobu Azuma, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 522 days.

(21) Appl. No.: 12/097,580

(22) PCT Filed: Dec. 15, 2006

(86) PCT No.: PCT/JP2006/325033
§ 371 (c)(1),
(2), (4) Date: Jun. 16, 2008

(87) PCT Pub. No.: WO2007/069719
PCT Pub. Date: Jun. 21, 2007

(65) Prior Publication Data
US 2009/0174303 A1    Jul. 9, 2009

(30) Foreign Application Priority Data
Dec. 16, 2005 (JP) .................................. 2005-363233

(51) Int. Cl.
*H01J 17/18* (2006.01)
(52) U.S. Cl. .............................. 313/623; 445/26; 313/25

(58) Field of Classification Search .................. 313/631, 313/25, 633, 634, 636, 623; 445/26, 40, 445/43
See application file for complete search history.

(56) References Cited

U.S. PATENT DOCUMENTS
5,075,587 A    12/1991    Pabst et al.

FOREIGN PATENT DOCUMENTS
| EP | 0448172 A1 | 9/1991 |
| JP | 62077190 A | 4/1987 |
| JP | 2189853 A | 7/1990 |
| JP | 4223037 A | 8/1992 |
| JP | 6290750 A | 10/1994 |

OTHER PUBLICATIONS

Kasori, Mitsuo et al., "Effects of Transition-Metal Additions on the Properties of AlN", J. Am. Ceram. Soc., vol. 77 (8), pp. 1991-2000.

*Primary Examiner* — Joseph L Williams
(74) *Attorney, Agent, or Firm* — The Webb Law Firm

(57) ABSTRACT

A cement for bonding an arc tube body made of an aluminum nitride sintered body and an electrode support made of molybdenum achieves high gas tightness in the obtainable arc tube without impairing the excellent translucency of the aluminum nitride sintered body. The cement contains a molybdenum powder and an aluminum nitride powder, and the total amount of metalloid elements, rare-earth elements and metal elements (except the rare-earth elements and aluminum element) corresponding to the following conditions (1) and (2) is 300 ppm or less: (1) metal elements having a melting point of 2000° C. or lower, and (2) metal elements having an ion radius smaller than that of aluminum.

13 Claims, 2 Drawing Sheets

[Fig.1]
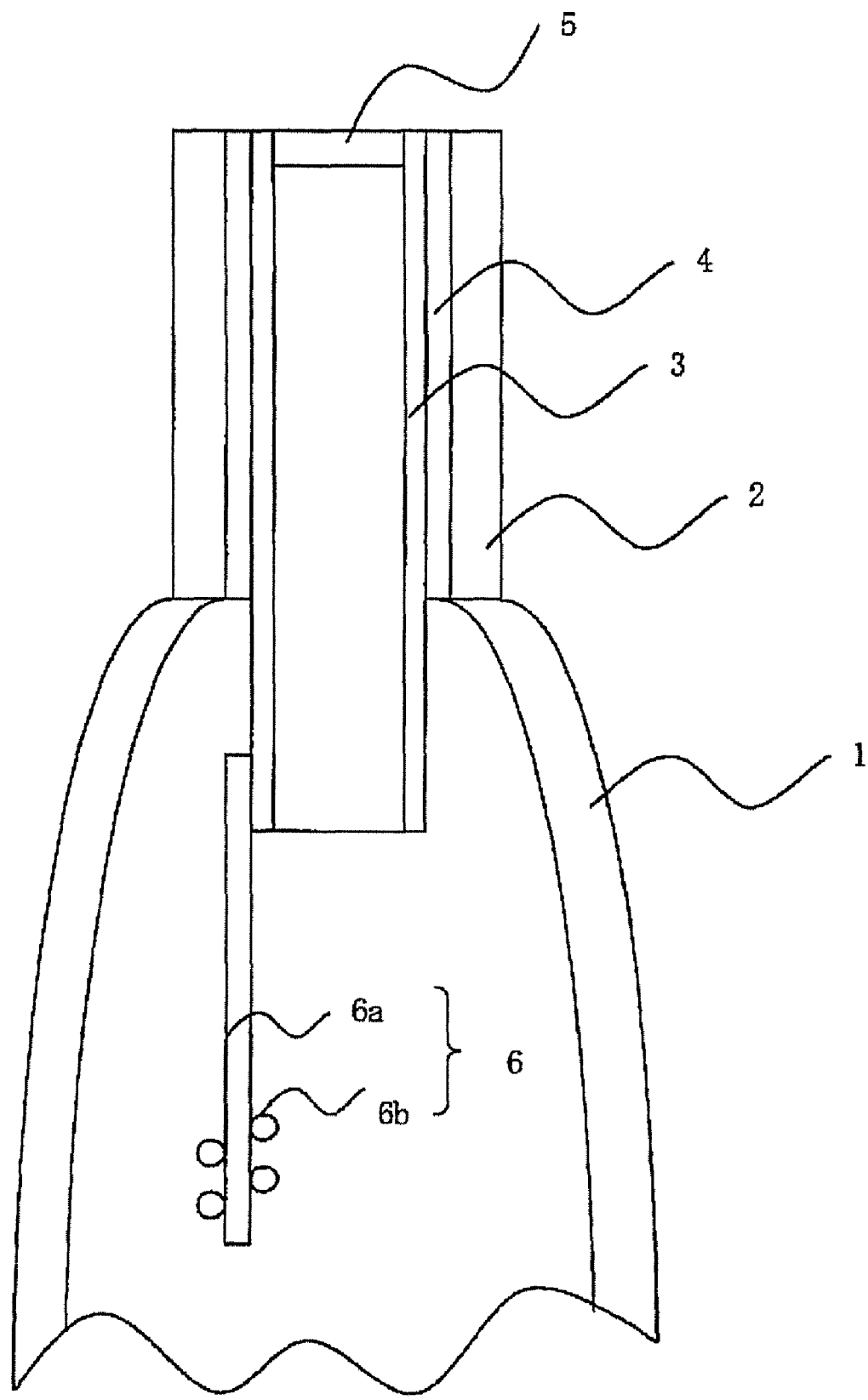

[Fig.2]
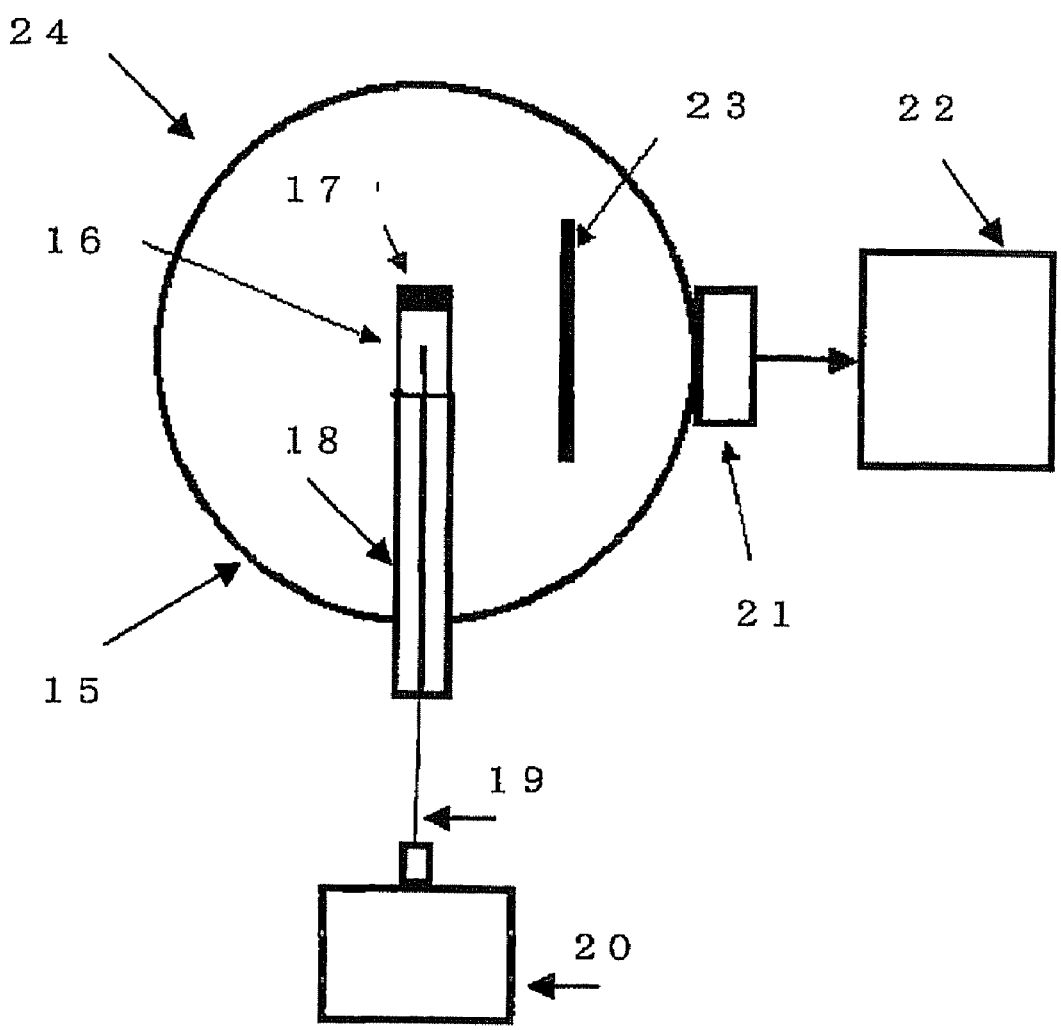

bonding an arc tube body made of an aluminum nitride sintered body and an electrode support made of molybdenum, wherein the arc tube produced has high gas tightness without impairing the excellent translucency of the aluminum nitride sintered body.

CEMENT FOR BONDING AN ALUMINUM NITRIDE ARC TUBE BODY TO A MOLYBDENUM ELECTRODE SUPPORT, ARTICLES MADE THEREFROM, AND METHODS FOR MAKING SAME

TECHNICAL FIELD

The present invention relates to a cement for bonding an arc tube body made of an aluminum nitride sintered body and an electrode support made of molybdenum. More specifically, the present invention relates to a cement containing a molybdenum powder and an aluminum nitride powder, which is used to bond an arc tube body made of an aluminum nitride sintered body and an electrode support made of molybdenum.

BACKGROUND ART

As a material for an arc tube of a high-pressure discharge lamp, translucent alumina has been conventionally used in place of quartz because translucent alumina has high heat resistance temperature of 1200° C. or higher and is produced relatively inexpensively.

However, a high-pressure discharge lamp using an arc tube made of an alumina sintered body has a short life of approximately 9000 hours. This is mainly due to the low thermal shock resistance of the alumina sintered body. In addition, in the case of a metal halide lamp, since alumina has low corrosion resistance to a metal halide gas of alumina, the life of the lamp is further reduced.

Consequently, in recent years, there have been developed arc tubes made of an aluminum nitride sintered body having a high translucency. Since the aluminum nitride sintered body is more excellent in thermal shock resistance and corrosion resistance than the alumina sintered body, the life of the lamp may be increased.

However, although excellent in corrosion resistance, the aluminum nitride sintered body has a problem of poor wettability with many molten metals. For this reason, it is difficult to strongly bond an arc tube made of an aluminum nitride sintered body and an electrode so that the gas tightness in the arc tube is kept high and the gas trapped in the arc tube does not leak.

In Patent Document 1, in order to increase gas tightness in an arc tube, an attempt has been made to bond an arc tube made of an aluminum nitride sintered body and an electrode through a tungsten layer and a layer of a brazing filler metal containing $Nd_2O_3$, $Y_2O_3$ and aluminum nitride.

However, this method requires two steps in which firstly a tungsten paste is applied on the arc tube and then the brazing filler metal is applied on the paste.

In addition, in Patent Documents 1 and 2, an attempt has also been made to directly bond an arc tube of an aluminum nitride sintered body and an electrode of tungsten or molybdenum by integrally sintering them without using any paste.

However, the arc tubes obtained by the above direct bonding have limited gas tightness.

Further, Non-Patent Document 1 describes that the transmittance of an aluminum nitride sintered body is reduced when impurities such as Zr, Co, Nb, Ta, W, Mn, Hf, Cr, Fe and Ti are incorporated in the sintered body.

[Patent Document 1] Japanese Patent Application Laid-Open Publication No. H02-189853
[Patent Document 2] Japanese Patent Application Laid-Open Publication No. H06-290750
[Non-Patent Document 1] J. Am. Ceram. Soc., 77 (8) 1991-2000 (1994)

An object of the present invention is to solve the problems involved in the conventional technology as mentioned above and is to provide a cement for bonding an arc tube body made of an aluminum nitride sintered body and an electrode support made of molybdenum, wherein the arc tube produced has high gas tightness without impairing the excellent translucency of the aluminum nitride sintered body.

Furthermore, another object of the present invention is to provide an arc tube having excellent translucency and corrosion resistance in which the arc tube body and the electrode support are integrated using the above-mentioned cement, and a high-pressure discharge lamp having a long life in which the arc tube is used.

SUMMARY OF THE INVENTION

As a result of the earnest studies to solve the above problems, the present inventors have found that a cement in which the amount of specific metal elements is reduced strongly bonds an arc tube body made of an aluminum nitride sintered body and an electrode support made of molybdenum without impairing the excellent translucency and corrosion resistance of the aluminum nitride sintered body, and have reached the completion of the present invention.

A cement according to the present invention is a cement for bonding an arc tube body made of an aluminum nitride sintered body and an electrode support made of molybdenum, wherein the cement comprises a molybdenum powder and an aluminum nitride powder; and the total amount of metalloid elements, rare-earth elements and metal elements (except the rare-earth elements and aluminum element) corresponding to the following conditions (1) and (2) is 300 ppm or less.

(1) metal elements having a melting point of 2000° C. or lower, and
(2) metal elements having an ion radius smaller than that of aluminum.

The above-mentioned cement preferably contains 30 to 70% by weight of the molybdenum powder and 70 to 30% by weight of the aluminum nitride powder, based on 100% by weight of the total amount of the molybdenum powder and the aluminum nitride powder.

In the above-mentioned cement, the aluminum nitride sintered body constituting the arc tube body preferably has an absorption rate of 10% or less per a thickness of 1 mm of the aluminum nitride sintered body.

An arc tube according to the present invention is an arc tube composed of an arc tube body made of a tubular aluminum nitride sintered body and a bar-shaped or tubular electrode support made of molybdenum in which the arc tube body and the electrode support are bonded through a mixed layer comprising molybdenum and aluminum nitride that is formed from the above-mentioned cement.

In the above-mentioned arc tube preferably, the aluminum nitride sintered body constituting the arc tube body after the above-mentioned bonding has an absorption rate of 10% or less per a thickness of 1 mm of the aluminum nitride sintered body.

A high-pressure discharge lamp according to the present invention comprises the above-mentioned arc tube.

A method for producing an arc tube according to the present invention is a method for producing an arc tube comprising an arc tube body made of a tubular aluminum nitride sintered body and a bar-shaped or tubular electrode support made of molybdenum, comprising a step in which a layer comprising the above-mentioned cement is formed on the inner surface of the arc tube body and/or on the external surface of the electrode support; and the arc tube body and the electrode support are integrated through the layer(s) comprising the cement.

The cement of the invention can bond an arc tube body made of an aluminum nitride sintered body and an electrode support made of molybdenum while achieving high gas tightness in the obtainable arc tube without impairing the excellent translucency of the aluminum nitride sintered body. According to the cement, there may be obtained an arc tube made of an aluminum nitride sintered body in which the arc tube body and the electrode support are strongly bonded, and a high-pressure discharge lamp having a long life in which the arc tube is used.

BRIEF DESCRIPTION OF THE DRAWINGS

FIG. 1 is an example of a partial sectional view of an embodiment arc tube made of an aluminum nitride sintered body according to the present invention; and FIG. 2 is a diagram illustrating a measurement method for the total light transmittance.

BEST MODE FOR CARRYING OUT THE INVENTION

Hereinafter, the present invention will be specifically explained.

<Molybdenum-Containing Paste>

The molybdenum-containing paste (cement) according to the present invention is, for example, a cement for bonding an arc tube body made of an aluminum nitride sintered body and an electrode support made of molybdenum. The molybdenum-containing paste contains a molybdenum powder and an aluminum nitride powder and contains coloring elements in a total amount of 300 ppm or less. Furthermore, the molybdenum-containing paste desirably has a total amount of coloring elements of preferably 200 ppm or less and more preferably 100 ppm or less. Here, the words "total amount of coloring elements of 300 ppm or less" mean that 300 mg or less of the elements are contained in total in 1 kg of the above-mentioned paste.

The above-mentioned coloring elements are metalloid elements, rare-earth elements and metal elements corresponding to the following conditions (1) and (2) (except the rare-earth elements and aluminum element).

(1) Metal elements having a melting point of 2000° C. or lower.

(2) Metal elements having an ion radius smaller than that of aluminum.

The ion radius is confirmed by a value described in well-known literature (for example, refer to the second edition of Ceramic Engineering Handbook, The Ceramic Society of Japan, GIHODO SHUPPAN Co., Ltd., page 682).

According to the Handbook, aluminum (valence: +3, coordination number: 4) has an ion radius of 0.53 Å.

The metal elements corresponding to the above conditions (1) and (2) easily sublimate in an AlN arc tube when AlN and Mo are bonded (heat treated). In addition, the metal elements having an ion radius smaller than that of aluminum are easily solid-dissolved in an AlN crystal. Therefore, if these metal elements are found in large amounts, the sublimation and solid-dissolution thereof will reduce the transmittance of the AlN arc tube.

Specific examples of the above elements include Cr, Cu, Fe, Ge, Mn, Ni, Si, Ti, V, Y, Sm, Yb, Er and the like. Among them, Ge and Si are metalloids and the others are metal elements.

Further, in the case that an arc tube made of an aluminum nitride sintered body is produced using an aluminum mixture powder containing metal elements Zr and Hf, the elements cause decrease in the transmittance of the arc tube. However, even if Zr and Hf are contained in the above paste, the transmittance of the AlN arc tube does not decrease because it is considered that they do not sublimate in the AlN arc tube at the time of the bonding (heat treating) of AlN and Mo.

In addition, the rare-earth elements include Y, Sm, Yb, Er and the like. Since such rare-earth elements themselves are colored and rare-earth oxides turn black when reduced at the time of the bonding (heat treating). This is thought to be a reason why they cause a decrease in the transmittance.

Further, the above-mentioned coloring elements are examples of those which may be industrially mixed in from raw materials. The amount of the coloring elements is obtained by determining the amount of these elements.

Furthermore, many of the above-mentioned coloring elements tend to form compounds which are easily corroded by a halide gas when the elements are contained in a junction between an arc tube body and an electrode support in a metal halide lamp. A highly durable high-pressure discharge lamp may be obtained by limiting the amount of such elements.

Moreover, since the molybdenum-containing paste of the present invention contains molybdenum and aluminum nitride, it can strongly bond an arc tube body made of an aluminum nitride sintered body and an electrode support made of molybdenum by forming a mixed layer therebetween which contains molybdenum and aluminum nitride. In addition, the thermal expansion coefficient of molybdenum is almost equivalent to that of aluminum nitride. For this reason, in a high-pressure discharge lamp using an arc tube having the above-mentioned mixed layer, the junction between the arc tube body and the electrode support has a high durability against thermal shock due to on-off cycles of the lamp. Therefore, the junction is highly resistant to cracking and high gas tightness of the arc tube is maintained. Therefore, the life of the lamp is extended.

The amount of the coloring elements in the above-mentioned molybdenum-containing paste is measured by ICP (high-frequency inductively coupled plasma) atomic emission spectrometry, and the measurement conditions will be described later.

The molybdenum powder has an average particle size of preferably from 0.5 to 10 μm, more preferably from 0.5 to 5 μm and further more preferably from 0.5 to 3 μm. In addition, the aluminum nitride powder has an average particle size of preferably from 0.5 to 10 μm, more preferably from 0.5 to 5 μm and further more preferably from 0.5 to 3 μm. When the average particle sizes are within the above ranges, the arc tube and the electrode support may be more strongly bonded by the mixed layer which is formed from the paste and contains the molybdenum and aluminum nitride, and further, higher gas tightness of the arc tube is maintained. In the present description, the average particle size means an average particle size determined by laser diffraction method.

In addition, one or two or more kinds of molybdenum powders having different average particle sizes and one or two or more kinds of aluminum nitride powders having different average particle sizes may be used in combination. In a preferable embodiment, the content of the molybdenum powder having an average particle size of 0.5 to 3 μm is 80% by weight or more based on the total molybdenum powder and the content of the aluminum nitride powder having an average particle size of 0.5 to 3 μm is 80% by weight or more based on the total aluminum nitride powder.

The above-mentioned molybdenum-containing paste contains the above-mentioned molybdenum powder preferably in an amount of 30 to 70% by weight, more preferably in an amount of 40 to 60% by weight and further more preferably in an amount of 45 to 55% by weight and the above-mentioned aluminum nitride powder preferably in an amount of 30 to 70% by weight, more preferably in an amount of 40 to 60% by weight and further more preferably in an amount of 45 to 55% by weight, based on the total amount of the molybdenum powder and the aluminum nitride powder. When the amounts of the molybdenum powder and the aluminum nitride powder are within the above ranges, the arc tube body and the electrode support may be more strongly bonded.

In addition, an alkaline earth compound and the like may be contained as a densifier in the paste. However, the alkaline earth compound is preferably used under the condition that it disappears during the sintering process. For example, the alkaline earth compound is contained typically in an amount of 0.5 to 10 parts by weight based on the total 100 parts by weight of the molybdenum powder and the aluminum nitride powder.

As the above-mentioned alkaline earth compounds, CaO, SrO, $Ca_3Al_2O_6$ and the like are preferably used. Among them, $Ca_3Al_2O_6$ is especially preferably used from the viewpoint of the easiness of disappearance in the sintering process.

As additional components, an organic binder, an organic solvent and the like may be contained in the above-mentioned molybdenum-containing paste, and further, a dispersant, a plasticizer and the like may be contained. These additional components are not particularly limited and well-known ones may be used.

Examples of the above-mentioned organic binders include, for example, acrylic resins such as polyacrylic ester, polymethacrylic ester and the like; cellulosic resins such as methylcellulose, ethylcellulose, hydroxymethylcellulose, nitrocellulose, cellulose acetate butylate and the like; vinyl group-containing resins such as polyvinylbutyral, polyvinylalcohol, polyvinyl chloride and the like; hydrocarbon resins such as polyolefin and the like; and polyethylene oxide.

Examples of the above-mentioned organic solvents include, for example, carbitol-based organic solvents such as methyl carbitol, ethyl carbitol, propyl carbitol, butyl carbitol, pentyl carbitol, hexyl carbitol and the like; cellosolve-based organic solvents such as propyl cellosolve, butyl cellosolve, pentyl cellosolve, hexyl cellosolve and the like and carboxylic acid esters thereof; terpineol; and 2,2,4-trimethyl-1,3-pentadiol monoisobutylate. The above organic solvents are suitably used because these solvents have high boiling points and the variation of the solid concentration caused by solvent evaporation is reduced.

Examples of the above-mentioned dispersants include a phosphate ester-based dispersant, a polycarboxylic acid-based dispersant and the like.

Examples of the above-mentioned plasticizers include ester-based plasticizers such as dibutylphthalate and the like; and carbitol-based plasticizers such as hexylcarbitol and the like.

These additional components may be each used singly or in combination of two or more kinds.

The above-mentioned molybdenum-containing paste may contain the organic binder preferably in an amount of 5 to 30 parts by weight, more preferably in an amount of 10 to 20 parts by weight, the above-mentioned organic solvent preferably in an amount of 5 to 30 parts by weight, more preferably in an amount of 10 to 20 parts by weight, the dispersant preferably in an amount of 0.1 to 5 parts by weight, more preferably in an amount of 0.5 to 3 parts by weight, and the plasticizer preferably in an amount of 5 to 30 parts by weight, more preferably in an amount of 10 to 20 parts by weight, based on the total 100 parts by weight of the molybdenum powder and the aluminum nitride powder. When the amounts of these additional components are within the above ranges, the paste obtained has an adequate fluidity and is easy to handle.

The method for producing the above-mentioned molybdenum-containing paste is not particularly limited as long as the molybdenum powder, the aluminum nitride powder and the above additional components as required are mixed to give a paste which is uniform in composition.

Examples of the above-mentioned production methods include kneading and the like using a three-roll mill, a planetary mixer and the like. The above-mentioned molybdenum-containing paste is preferably prepared so that the attainable viscosity is 1000 to 30000 poise and preferably 1500 to 25000 poise at 25° C. because the paste is easily handled when it is used to bond the arc tube and the electrode support.

In the molybdenum-containing paste according to the present invention, in order to reduce the amount of the coloring elements to the specific level or less, a molybdenum powder having a small amount of the coloring elements and a purity of 99.98% by weight or more and preferably 99.99% by weight or more may be used in preparing the paste. In other words, a molybdenum powder having a total amount of the coloring elements of 200 ppm or less and a purity of 99.98% by weight or more and preferably a molybdenum powder having a total amount of the coloring elements of 100 ppm or less and a purity of 99.99% by weight or more may be used.

In addition, an aluminum nitride powder having a small amount of the coloring elements and a purity of 99% by weight or more is used, and most preferably an aluminum nitride powder in which the oxygen concentration is reduced to 0.8% by weight or less and which has a total amount of Fe, Ni and the like of 100 ppm or less is used.

Further, the additional components which are optionally added during the preparation of the cement of the present invention will be of high purity with a small amount of the above-mentioned coloring elements.

<Arc Tube Made of Aluminum Nitride Sintered Body>

The arc tube made of an aluminum nitride sintered body according to the present invention is obtained by integrating an arc tube body and an electrode support made of molybdenum through a mixed layer containing molybdenum and an aluminum nitride sintered body. The above-mentioned mixed layer is formed using the above-mentioned molybdenum-containing paste. In other words, the arc tube according to the present invention is composed of an arc tube body made of a tubular aluminum nitride sintered body and a bar-shaped or tubular electrode support made of molybdenum, and is obtained by integrating the arc tube body and the electrode support through a mixed layer which is formed from the above-mentioned paste and contains molybdenum and aluminum nitride.

FIG. 1 shows an example of a partial cross-sectional view of the arc tube made of aluminum nitride sintered body. The arc tube according to the present invention is not limited to the structure shown in the figure.

Individual narrow tube parts 2 are provided at both sides of an arc tube body 1 made of a tubular aluminum nitride sintered body. The narrow tube parts 2 may not be provided. One of the narrow tube parts 2 is shown in FIG. 1. Electrode supports 3 made of molybdenum having a tubular structure are inserted through the narrow tube parts 2. The electrode supports 3 at both sides and the arc tube body 1 are integrated by a mixed layer 4 containing molybdenum and aluminum nitride.

Of the electrode supports 3 on both sides, at least one electrode support preferably has tubular ends as shown in FIG. 1, through which air is discharged or an activating gas such as argon or xenon, and an emitting metal material such as mercury, sodium or a metal halide are placed in the tube. The structure of the electrode support 3 on the other side may be rod-shaped (bar-shaped) or tubular (tube-shaped). The activating gas and metal material are placed through the tubular electrode support 3 and then the end of the electrode support 3 is sealed with a sealant 5 such as molybdenum, tungsten or the like. Electrodes 6 are bonded to the tip of the electrode supports 3 on both sides. The electrode 6 has an electrode axis 6a made of tungsten. Around the electrode axis 6a, a tungsten wire is wound in for example two layers to form an electrode coil 6b.

The thickness of the mixed layer containing molybdenum and aluminum nitride, which varies depending on the size, the shape and the like of the arc tube body made of the aluminum nitride sintered body, is typically 0.01 to 0.5 mm and preferably 0.05 to 0.2 mm. This thickness ensures that the above-mentioned arc tube and the above-mentioned electrode supports are strongly bonded through the above-mentioned mixed layer.

[Arc Tube Body Made of Aluminum Nitride Sintered Body]

The arc tube body made of the aluminum nitride sintered body is obtained by sintering a green body in an arc tube shape which is made of an aluminum nitride powder, a sintering aid, an organic binder, a dispersant, a plasticizer and the like.

As the aluminum nitride powder used as a raw material, powder which will attain a crystal particle size of 2 to 20 μm by sintering is preferably used. In general, in consideration of the particle growth by sintering, powder in which the average particle size is slightly smaller than the above-described crystal particle size is suitably used. For example, powder having an average particle size of 0.5 to 15 μm, or 1 to 10 μm is preferred.

In addition, in order to reduce the impurity concentration in the above-mentioned arc tube body to a low level, a high-purity aluminum nitride powder having a purity of 97% by weight or more and preferably 99% by weight or more is desirable. Most suitably, a high-purity aluminum nitride in which the metal impurities concentration (the concentration of metals except Al) is 50 ppm or less, and the oxygen concentration is reduced to 1% by weight or less and especially to 0.8% by weight or less is used.

Examples of the sintering aids include well-known aids and, for example, alkaline-earth-based oxides such as CaO, SrO and the like and rare earth-based oxides such as $Y_2O_3$, $CeO_2$, $Ho_2O_3$, $Yb_2O_3$, $Gd_2O_3$, $Nd_2O_3$, $Sm_2O_3$, $Dy_2O_3$ and the like are mentioned. Most typically used is yttrium oxide ($Y_2O_3$). In addition, the above-mentioned sintering aids are not always required to be oxides, and include, for example, carbonates, nitrates, phosphates and the like.

The sintering aids are used to form a liquid phase in sintering to increase the degree of sintering. The particle size of the aid is not particularly limited, but is preferably 5 μm or less and especially preferably 0.05 to 3 μm because, in general, the smaller the particle size is, the more easily a liquid phase is formed. In addition, the sintering aid preferably has a relatively large specific surface area (preferably BET specific surface area: 20 to 50 $m^2/g$).

The sintering aids may be used alone. However, the aids may be more preferably used in combination of plural kinds, in which case the melting point is decreased to facilitate the liquid phase formation in sintering and to accelerate the sublimation of the sintering aids, and the impurity concentration is consequently reduced, whereby the translucency of the arc tube made of the aluminum nitride sintered body is further improved. In the use of such combination of the sintering aids, the weight ratio of a minor aid (hereinafter referred to as the sub-aid) to a major aid (hereinafter referred to as the main aid) (sub-aid/main aid) is preferably in the range of 0.01 to 0.5 and especially 0.05 to 0.3. In addition, the sub-aids may be one or two or more kinds, and when two or more kinds of sub-aids are used, the total amount preferably satisfies the above weight ratio. Further, the sub-aid preferably has a melting point lower than that of the main aid. For the sub-aids such as carbonates which are decomposed by heating to form oxides, the melting points in the forms of oxides may be compared to that of the major aid.

The amount of the above-described sintering aid is in the range of 0.1 to 4 parts by weight and especially 1 to 3.5 parts by weight based on 100 parts by weight of the aluminum nitride powder in order to obtain an arc tube made of an aluminum nitride sintered body in which the impurity concentration is reduced within the above range and optical properties such as translucency and the like are excellent.

The mixing of the aluminum nitride powder and the sintering aid powder is carried out by a well-known method. For example, mixing with a blender such as a ball mill and the like in a dry or wet system is suitably adopted. In addition, in the wet mixing, dispersion mediums such as alcohols, hydrocarbons and the like are used, but in view of dispersibility, alcohols and hydrocarbons are preferably used.

In the mixing, it is advisable that the sintering aid powder is stored in dry air and is vacuum dried as required, and the powder is immediately mixed with the aluminum nitride powder to prevent the sintering aid from adsorbing water or from being aggregated.

Prior to sintering, the above-mentioned mixed powder is molded into an arc tube shape. The molding may be carried out by means which is well-known, but is preferably carried out by using an organic binder so that a green body in an arc tube shape having high strength can be obtained and the yield can be increased.

For example, the above-mentioned mixed powder is mixed with the organic binder, and with a dispersant, a plasticizer, a solvent and the like where necessary to give a slurry or paste for molding, and then the slurry or paste for molding is molded by molding means such as extrusion molding, injection molding, casting molding or the like to give the green body.

The organic binders include butyral resins such as polyvinylbutyral and the like; and acrylic resins such as polymethacrylbutyl and the like. Such organic binder is used in an amount of 0.1 to 30 parts by weight and especially 1 to 15 parts by weight, based on 100 parts by weight of the aluminum nitride powder.

In addition, the dispersants include glycerin compounds and the like. The plasticizers include phthalate esters and the like. The solvents include isopropyl alcohol, hydrocarbons and the like.

Further, the molding may be carried out by compression molding without using the organic binder. For example, the mixed powder of the aluminum nitride powder and the sintering aid powder is molded into a pre-molded green body by using a single-screw molding machine, and then the body is molded by using a CIP (cold isostatic press) molding machine under a pressure of 1 to 4 t/cm² to prepare the above-mentioned green body.

The resulting green body is de-waxed (debindered), and then sintered.

As a sintering method for an arc tube according to the present invention, either of the two processes known as a post-firing process and a co-firing process may be used. The green body in an arc tube shape shrinks in its dimension during the sintering. Therefore, in order to obtain an arc tube having a high dimension accuracy, the post-firing process is preferably used. In addition, since the above-mentioned green body and the above-mentioned paste layer are sintered separately in this process, adequate conditions for the sintering of the above-mentioned paste layer are used. For this reason, there is an advantage of obtaining an arc tube having a higher translucency. On the other hand, the co-firing process has an advantage of suppressing the production cost because the above-mentioned green body and the above-mentioned paste layer are sintered simultaneously.

In the post-firing process, the green body in an arc tube shape is firstly de-waxed.

The de-waxing may be carried out by heating the green body in arbitrary atmospheres such as air, nitrogen, hydrogen and the like, but is preferably carried out in nitrogen where the residual carbon amount is easily controlled. In addition, the de-waxing temperature, which varies depending on the organic binders used, is typically 300 to 900° C. and especially preferably 300 to 700° C. In addition, as in the case of the compression molding, when the molding is carried out without using any organic binder, the de-waxing process is not required.

Next, the sintering is carried out under a reducing atmosphere in order to effectively remove the sintering aid and reduce the metal impurity concentration and oxygen concentration in the sintered body.

Examples of the methods for creating the above-mentioned reducing atmosphere include allowing a carbon source to coexist with the above-mentioned green body in a vessel for sintering, using a vessel made of carbon as a vessel for sintering, and the like. Among them, in consideration of the thermal conductivity, color heterogeneity and the like of the obtainable arc tube body, allowing a carbon source to coexist with the above-mentioned green body in a vessel for sintering is preferred. In particular, a closed vessel is most preferably used as the sintering vessel and the above-mentioned green body and the carbon source are placed in the closed vessel, in order to obtain a high thermal conductivity.

In addition, the above-mentioned carbon source is not particularly limited. Carbons in a well-known form such as amorphous carbon, graphite and the like are used, and carbons in a solid form are preferred. The shapes of the above-mentioned carbons are not particularly limited, but may be any of powder, fiber, felt, sheet and plate, and may be a combination of these shapes. Among them, in consideration of obtaining a high thermal conductivity, amorphous carbon or graphite in a plate form is preferred.

Further, embodiments of placing the above-mentioned green body and the carbon in the vessel are not particularly limited. The carbon and the above-mentioned green body may be placed either in contact or without contact with each other. The non-contact placement is preferred in terms of easiness of controlling the thermal conductivity of the arc tube body. In addition, as the non-contact placement, a well-known embodiment may be adopted. In an embodiment of the non-contact placement, for example, an interval may be simply provided between the carbon and the above-mentioned green body, a powder such as a boron nitride powder and the like may be placed between the carbon and the above-mentioned green body to separate them, or a plate and the like made of ceramics such as aluminum nitride, boron nitride and the like may be installed between the carbon and the above-mentioned green body to prevent them from contact. However, in consideration of increasing the thermal conductivity, installing a plate and the like between the carbon and the above-mentioned green body to make them in non-contact is preferred. In a particularly preferable embodiment, the plate may be installed so that the space accommodating the carbon and the space accommodating the above-mentioned green body are separated as much as possible in the closed vessel, in order to obtain an arc tube body having a still higher thermal conductivity.

The sintering under the above-mentioned reducing atmosphere is preferably carried out at a temperature of 1500 to 2000° C. for at least 3 hours, especially for at least 10 hours. In addition, when the above-mentioned sintering is carried out for a long period of time, the crystal particle growth of aluminum nitride in the arc tube body occurs and further the carbon concentration in the above-mentioned arc tube body increases, which may impair the translucency, and thus the sintering time under the reducing atmosphere is preferably 200 hours or less, especially 100 hours or less and most preferably 50 hours or less.

Further, in order to reliably reduce the carbon concentration in the above-mentioned arc tube body, the sintering under a neutral atmosphere is preferably carried out in combination with the sintering under the above-mentioned reducing atmosphere. For example, the sintering may be preferably performed under a neutral atmosphere and then under the reducing atmosphere, or may be preferably performed under a neutral atmosphere, then under the reducing atmosphere and under a neutral atmosphere. The sintering in this manner is preferable because when the sintering is carried out under the reducing atmosphere for a long time, the carbon concentration is increased though the metal impurity concentration is suppressed within the above range, resulting in deterioration in translucency of the arc tube body. Therefore, the sintering time under the reducing atmosphere is limited to the above range and the sintering is appropriately carried out under a neutral atmosphere, thereby making it possible to obtain the above-mentioned arc tube body which is dense and highly strong.

Here, the above-mentioned neutral atmosphere means a state where substantially no oxygen [$O_2$] and carbon (C) exist in the atmosphere and specifically means an inert gas atmosphere such as nitrogen, argon and the like. The sintering in the neutral atmosphere is carried out, for example, after the closed vessel is purged with an inert gas. Further, as the closed vessel, vessels made of ceramics such as aluminum nitride, boron nitride and the like and vessels made of non-carbon materials such as tungsten [W], molybdenum [Mo] and the like are used. Especially the vessels made of ceramics such as aluminum nitride, boron nitride and the like are preferred in terms of durability. Further carbonaceous vessels in which the interior surface is coated with the above-mentioned non-carbonaceous gas impermeable material may be used. In short, the sintering should be carried out in a state where no carbon source other than the residual carbon in the above-mentioned green body is present in the space inside the closed vessel.

The sintering temperature under the neutral atmosphere as mentioned above is preferably 1500 to 1900° C., and the sintering time, which varies depending on the sintering time under the reducing atmosphere, is typically 3 to 100 hours and especially preferably 30 to 50 hours.

Subsequently, the light transmittance property of the arc tube may be further improved by heat treating (annealing) the resulting arc tube body under the coexistence of an aluminum compound decomposable at high temperatures. The aluminum compound decomposable at high temperatures which is made to coexist is preferably a material that is stably present at the intermediate stage and further at the final stage of the sintering of aluminum nitride, and releases an aluminum-based gas in the gas phase. In other words, the aluminum compound is preferably a material that is stably present at a temperature of 1000° C. or higher and releases an aluminum-based gas. Examples of the aluminum compounds include $Al_2O_3$, $Al_2S_3$, $AlF_3$, AlN and the like. Further, aluminum nitride used as the aluminum compound decomposable at high temperatures, unlike the arc tube of the present invention obtained through the above-mentioned sintering process, sustainedly releases an aluminum-based gas at a temperature of approximately 1500° C. The sustained-gas-release property of aluminum nitride decomposable at high temperatures is considered to be due to the composition and structure of the grain boundary phase. These aluminum compounds decomposable at high temperatures may be any form of a powder, a molded body, a sintered body and the like, and a similar effect may be obtained when the above-mentioned sintered arc tube body is exposed to a gasified aluminum compound. In the annealing process, $N_2$ gas is flowed under a condition of 0.1 to 30 L/min. The arc tube body is annealed in a dense sintering vessel made of carbon, boron nitride, aluminum nitride or the like in the presence of the high temperature-decomposable aluminum compound at a temperature of 1600 to 2000° C. for 1 to 200 hours.

Although not wanting to be bound to any particular theory, the improvement in optical properties such as translucency by the annealing is probably because aluminum is supplemented in hole defects in the arc tube body and the crystal grains of aluminum nitride become perfect or nearly perfect.

In the arc tube body obtained as mentioned above, an absorption rate of typically 10% or less and preferably 5% or less per a thickness of 1 mm of the aluminum nitride sintered body constituting the arc tube body is obtained.

[Bonding of Arc Tube Body and Electrode Support]

After the annealing treatment has been carried out where necessary, the above-mentioned molybdenum-containing paste is applied, for example, on the inner surface of the narrow tube part of the arc tube body by printing and the like. After the paste is applied, the electrode support made of molybdenum is inserted into the above-mentioned narrow tube part. The above-mentioned paste may be applied only on the surface of the above-mentioned electrode support which will be in contact with the above-mentioned narrow tube part, but is preferably applied both on the inner surface of the above-mentioned narrow tube part and on the surface of the above-mentioned electrode support.

In other words, a method for producing an arc tube according to the present invention is a method for producing an arc tube composed of an arc tube body made of a tubular aluminum nitride sintered body and bar-shaped or tubular electrode supports made of molybdenum, comprising a step in which a layer made of the above-mentioned paste is formed on the inner surface of the arc tube body and/or on the external surface of the electrode supports and the arc tube body and the electrode supports are integrated through the layer made of the paste.

The above method is not limited to the production of arc tubes, and may be suitably used for the manufacturing of complexes composed of an aluminum nitride sintered body and molybdenum metal wherein the molybdenum-containing paste is applied on the inner surface of the tubular aluminum nitride sintered body and on the external surface of the bar-shaped or tubular molybdenum metal, and the aluminum nitride sintered body and the molybdenum metal are bonded through the molybdenum-containing paste.

From the viewpoint of bonding strength, the thickness of the above-mentioned molybdenum-containing paste layer, which varies depending on the size and shape of the above-mentioned arc tube body, is typically 0.013 to 0.625 mm and preferably 0.0625 to 0.25 mm. When the molybdenum-containing paste is applied both on the inner surface of the above-mentioned narrow tube part and on the surface of the above-mentioned electrode support, the total thickness of the paste layers is preferably in the above-mentioned range.

Subsequently, the above-mentioned arc tube into which the above-mentioned electrode support is inserted is de-waxed as required. After the de-waxing, the above-mentioned arc tube is sintered. The de-waxing and sintering may be carried out under similar conditions to those for the above-mentioned green body in an arc tube shape. Both the de-waxing and sintering are preferably carried out in a neutral atmosphere in order to prevent the sublimation of molybdenum in the above-mentioned paste.

In this way, molybdenum and aluminum nitride contained in the paste are sintered and the above-mentioned paste layer forms a mixed layer, and an arc tube in which the above-mentioned arc tube body and the above-mentioned electrode supports are bonded together (integrated) with high gas tightness is obtained.

On the one hand, in the co-firing process, firstly the above-mentioned molybdenum-containing paste is applied on the inner surface of the narrow tube part of the above-mentioned green body in an arc tube shape by printing and the like. After the paste is applied, the electrode support made of molybdenum is inserted into the arc tube body. The above-mentioned paste may be applied only on the surface of the above-mentioned electrode support which will be in contact with the above-mentioned narrow tube part, but is preferably applied both on the inner surface of the above-mentioned narrow tube part and on the surface of the above-mentioned electrode support.

After the above-mentioned electrode supports are inserted into the above-mentioned green body, the green body is de-waxed as required. Thereafter, the above-mentioned green body is sintered. The de-waxing and sintering may be carried out under similar conditions to those for the above-mentioned green body in an arc tube shape in the post-firing process.

In the co-firing process too, molybdenum and aluminum nitride contained in the above-mentioned paste are sintered and the paste layer forms a mixed layer and the green body is sintered to form an arc tube body, and an arc tube in which the arc tube body and the electrode supports are bonded together (integrated) with high gas tightness is obtained.

Regardless of whether an arc tube is obtained by the post-firing process or by the co-firing process, since the arc tube is produced by using the above-mentioned paste, high gas tightness is obtained without impairing the excellent translucency of the aluminum nitride sintered body.

In particular, when the arc tube body (aluminum nitride sintered body) subjected to the bonding process (integrating process) has an absorption rate of 10% or less and preferably 5% or less per a thickness of 1 mm of the arc tube body, the integrated arc tube body (aluminum nitride sintered body) will have an absorption rate of 10% or less and preferably 5% or less per a thickness of 1 mm of the arc tube body. This is because the amount of the specific elements in the paste is reduced, so that the diffusion of these elements to the arc tube body during the bonding process is suppressed and the reduction in transmittance of the arc tube is prevented. The measurement method for the transmittance of the arc tube will be explained in Examples.

<High-Pressure Discharge Lamp Having Arc Tube Made of Aluminum Nitride Sintered Body>

The high-pressure discharge lamp according to the present invention is characterized by having the above-mentioned arc tube. The arc tube made of the aluminum nitride sintered body according to the present invention is suitably used as high-pressure discharge lamps such as a mercury lamp, a high-pressure sodium lamp, a metal halide lamp and the like after the arc tube is charged with an activating gas, a metal material for emission and the like and then an outer tube, a cap and the like are mounted to the arc tube by a well-known method.

Hereinafter, the present invention will be explained more specifically based on Examples, but the present invention is not limited to these Examples.

EXAMPLES

The measurements of various physical properties in the Examples were carried out as follows.

1) Particle Size of Molybdenum Powder and Aluminum Nitride Powder

The average particle size was measured by a laser diffraction method using "MICROTRAC II" manufactured by LEED&NORTHRP.

2) Content of Coloring Elements

Molybdenum Powder

The molybdenum powder was dissolved in a mixed solution of nitric acid and phosphoric acid under heating and then the solution was neutralized with an acid. The quantitative analysis was carried out by ICP atomic emission spectrometry using "ICPS-1000" manufactured by Shimadzu Corporation.

Aluminum Nitride Powder

The aluminum nitride powder was dissolved in a mixed solution of nitric acid and phosphoric acid under heating and then the solution was neutralized with an acid. The quantitative analysis was carried out by ICP atomic emission spectrometry using "ICPS-1000" manufactured by Shimadzu Corporation.

The paste was de-waxed in an oxidizing atmosphere and the binder was removed to give dried molybdenum and aluminum nitride powders. The resulting powders were heated and dissolved in a mixed solution of nitric acid and phosphoric acid under heating and then the solution was neutralized with an acid. The quantitative analysis was carried out by ICP atomic emission spectrometry using "ICPS-1000" manufactured by Shimadzu Corporation.

3) Viscosity of Molybdenum-Containing Paste

The viscosity was measured by using a digital viscometer, "DVL-B", manufactured by Tokyo Keiki Co., Ltd.

4) Light Transmittance

The light transmittance of the arc tube was measured as an amount of light leaked out when a halogen light was introduced into an integrating sphere through an optical fiber and the tip of the optical fiber was covered with the sample. The transmittance was expressed in percentage relative to the transmittance obtained when the tip was not covered with the sample, in other words, air as a reference.

5) Gas Leakage Amount

The gas leakage amount was determined as the helium leakage amount measured by using "MSE-CARRY II" manufactured by Shimadzu Emit Co., Ltd.

6) Absorption Rate

The absorption rate of the aluminum nitride sintered body for constituting an arc tube body was determined by first obtaining the total light transmittance per a thickness of 1 mm of the tubular sintered body and then performing the calculation by the following equation (1) In addition, the absorption rate of the aluminum nitride sintered body constituting the arc tube body after the bonding process was also measured in the same manner.

The absorption rate=100−the total light transmittance (1)

Further, the total light transmittance of the arc tube (sample 16) was measured by using a light transmittance measurement device 24 shown in FIG. 2. The light used for the measurement was a visible light having a wavelength of 300 to 800 nm. The light transmittance was calculated from the amount of light leaked from the exterior wall of the sample tube when the light emitted from a light source 20 was introduced through an optical fiber 19 to the sample tube on which a cap 17 was mounted. In addition, as shown in FIG. 2, the light transmittance measurement device 24 was equipped with an integrating sphere 15, a sample support 18, a detector 21, a display 22 and a buffer plate 23.

Example 1

Molybdenum-Containing Paste

A molybdenum-containing paste was obtained by kneading 50 parts by weight of an aluminum nitride powder having an average particle size of 1.1 μm (purity: 99% by weight; the total amount of Cr, Cu, Fe, Ge, Mn, Ni, Si, Ti, V, Y, Sm, Yb and Er: 50 ppm), 10 parts by weight of ethylcellulose, 15 parts by weight of terpineole and 0.6 parts by weight of a dispersant, based on 50 parts by weight of a molybdenum powder having an average particle size of 2.1 μm (purity: 99.98% by weight; the total amount of Cr, Cu, Fe, Ge, Mn, Ni, Si, Ti, V, Y, Sm, Yb and Er: 320 ppm) The attainable viscosity was 18000 poise at 25° C. The total amount of Cr, Cu, Fe, Ge, Mn, Ni, Si, Ti, V, Y, Sm, Yb and Er in the paste was 185 ppm.

Example 2

Arc Tube Made of Aluminum Nitride Sintered body

<Production of Arc Tube Body Made of Aluminum Nitride Sintered Body>

Five parts by weight of a calcium aluminate compound ($Ca_3Al_2O_6$) having an average particle size of 1.8 μm and a specific surface area of 3.75 $m^2/g$ as a sintering aid powder and further 30 parts by weight of an organic component were added to 100 parts by weight of an aluminum nitride powder having an average particle size of 1.1 μm, a specific surface area of 3.39 $m^2/g$, an oxygen concentration of 0.8% by weight and a metal element concentration of 35 ppm and the mixture was kneaded. Thereafter, the kneaded product was extruded with an extruder into spherical pellets having a diameter of 2 mm. Subsequently, the resulting pellets were molded into an arc tube shape with an injection molding machine. The molded product was a nearly spheroid shape and had a maximum inside diameter at the central part of 10 mm, an internal volume of 1.2 cc and a wall thickness of 1.0 mm.

The molded product obtained in the above operation was de-waxed at 550° C. for 4 hours in air, and then sintered at 1880° C. for 30 hours in a gas atmosphere in which a reducing substance was dispersed in nitrogen by using a setter made of aluminum nitride. Further, the resulting sintered body was placed in a setter made of aluminum nitride to which 3 g of an alumina powder was added as an aluminum compound decomposable at high temperatures, and was annealed at 1880° C. for 30 hours to give an aluminum nitride sintered body (an arc tube body). The absorption rate was 6% per a thickness of 1 mm of the aluminum nitride sintered body which would constitute the arc tube body.

<Integration of Arc Tube Body Made of Aluminum Nitride Sintered Body and Electrode Support Made of Molybdenum>

The arc tube body (the aluminum nitride sintered body) made of the aluminum nitride sintered body obtained by the above operation was a nearly spheroid shape and had a maximum inside diameter at the central part of 9 mm, an internal volume of 0.9 cc and a wall thickness of 0.8 mm. The narrow tube part had an inside diameter of 1 mm and a length of 20 mm. An electrode support made of molybdenum used had a diameter of 0.8 mm and a length of 16 mm. The molybdenum-containing paste prepared in Example 1 was printed on the inside wall of the narrow tube part of the aluminum nitride sintered body. In addition, the paste was printed also on the surface of the electrode support made of molybdenum which would be in contact with the narrow tube part. Subsequently, the above-mentioned electrode support was inserted into the narrow tube part of the aluminum nitride sintered body. The de-waxing was carried out at 580° C. for a maximum temperature holding time of 4 hours in air. Further, the sintering was carried out at 1880° C. for a holding time of 30 hours. As a result, the resulting arc tube had a light transmittance of 95%. Further, the gas tightness between the arc tube made of the aluminum nitride sintered body and the bonded part of the electrode support made of molybdenum was satisfactory and the gas leakage amount in the helium leak test was less than $10^{-7}$ atm-cc/sec. In addition, the absorption rate was 8% per a thickness of 1 mm of the aluminum nitride sintered body constituting the arc tube body after the bonding.

Example 3

Molybdenum-Containing Paste

A molybdenum-containing paste was prepared in the same manner as in Example 1 except that 30 parts by weight of a molybdenum powder having an average particle size of 2.1 µm (purity: 99.9% by weight; the total amount of Cr, Cu, Fe, Ge, Mn, Ni, Si, Ti, V, Y, Sm, Yb and Er: 215 ppm) and 70 parts by weight of an aluminum nitride powder having an average particle size of 1.1 µm (purity: 99% by weight; the total amount of Cr, Cu, Fe, Ge, Mn, Ni, Si, Ti, V, Y, Sm, Yb and Er: 50 ppm) were used in place of 50 parts by weight of the molybdenum powder having an average particle size of 2.1 µm and 50 parts by weight of the aluminum nitride powder having an average particle size of 1.1 µm. The attainable viscosity was 18000 poise at 25° C. The total amount of Cr, Cu, Fe, Ge, Mn, Ni, Si, Ti, V, Y, Sm, Yb and Er in the paste was 100 ppm.

Example 4

Arc Tube Made of Aluminum Nitride Sintered Body

<Integration of Arc Tube Body Made of Aluminum Nitride Sintered Body and Electrode Support Made of Molybdenum>

An arc tube was prepared in the same manner as in Example 2 except that the molybdenum-containing paste prepared in Example 3 was used in place of the molybdenum-containing paste prepared in Example 1. As a result, the resulting arc tube had a light transmittance of 96%. Further, the gas tightness between the arc tube made of the aluminum nitride sintered body and the bonded part of the electrode support made of molybdenum was satisfactory and the gas leakage amount in the helium leak test was less than $10^{-7}$ atm-cc/sec. In addition, the absorption rate was 6% per a thickness of 1 mm of the aluminum nitride sintered body constituting the arc tube body after the bonding.

Example 5

Molybdenum-Containing Paste

A molybdenum-containing paste was prepared in the same manner as in Example 1 except that 70 parts by weight of a molybdenum powder having an average particle size of 2.1 µm (purity: 99.9% by weight; the total amount of Cr, Cu, Fe, Ge, Mn, Ni, Si, Ti, V, Y, Sm, Yb and Er: 50 ppm) and 30 parts by weight of an aluminum nitride powder having an average particle size of 1.1 µm (purity: 99% by weight; the total amount of Cr, Cu, Fe, Ge, Mn, Ni, Si, Ti, V, Y, Sm, Yb and Er: 215 ppm) were used in place of 50 parts by weight of the molybdenum powder having an average particle size of 2.1 µm and 50 parts by weight of the aluminum nitride powder having an average particle size of 1.1 µm and that 2.5 parts by weight of a calcium aluminate compound ($Ca_3Al_2O_6$) was further used in preparing the paste. The attainable viscosity was 19000 poise at 25° C. The total amount of Cr, Cu, Fe, Ge, Mn, Ni, Si, Ti, V, Y, Sm, Yb and Er in the paste was 100 ppm.

Example 6

Arc Tube Made of Aluminum Nitride Sintered Body

<Integration of Arc Tube Body Made of Aluminum Nitride Sintered Body and Electrode Support Made of Molybdenum>

An arc tube was prepared in the same manner as in Example 2 except that the molybdenum-containing paste prepared in Example 5 was used in place of the molybdenum-containing paste prepared in Example 1. $Ca_3Al_2O_6$ disappeared due to the sintering conditions. As a result, the resulting arc tube had a light transmittance of 96%. Further, the gas tightness between the arc tube made of the aluminum nitride sintered body and the bonded part of the electrode support made of molybdenum was satisfactory, and the gas leakage amount in the helium leak test was less than $10^{-7}$ atm-cc/sec. In addition, the absorption rate was 6% per a thickness of 1 mm of the aluminum nitride sintered body constituting the arc tube body after the bonding.

Comparative Example 1

Molybdenum-Containing Paste

A molybdenum-containing paste was prepared in the same manner as in Example 1 except that 10 parts by weight of a molybdenum powder having an average particle size of 2.1 µm (purity: 99.3% by weight; the total amount of Cr, Cu, Fe, Ge, Mn, Ni, Si, Ti, V, Y, Sm, Yb and Er: 4100 ppm) and 90 parts by weight of an aluminum nitride powder having an average particle size of 1.1 µm (purity: 99.6% by weight; the total amount of Cr, Cu, Fe, Ge, Mn, Ni, Si, Ti, V, Y, Sm, Yb and Er: 100 ppm) were used in place of 50 parts by weight of the molybdenum powder having an average particle size of 2.1 µm and 50 parts by weight of the aluminum nitride powder having an average particle size of 1.1 μm. The attainable viscosity was 18000 poise at 25° C. The total amount of Cr, Cu, Fe, Ge, Mn, Ni, Si, Ti, V, Y, Sm, Yb and Er in the paste was 500 ppm.

Comparative Example 2

Arc Tube Made of Aluminum Nitride Sintered Body

An arc tube was prepared in the same manner as in Example 2 except that the molybdenum-containing paste prepared in Comparative Example 1 was used in place of the molybdenum-containing paste prepared in Example 1. The resulting arc tube had a light transmittance of 85%, which was below a desired level. Further, as for the gas tightness between the arc tube made of the aluminum nitride sintered body and the bonded part of the electrode support made of molybdenum, the gas leakage amount in the helium leak test was $10^{-7}$ atm-cc/sec or more. In addition, the absorption rate was 20% per a thickness of 1 mm of the aluminum nitride sintered body constituting the arc tube body after the bonding.

The invention claimed is:

1. A cement for bonding an arc tube body made of an aluminum nitride sintered body and an electrode support made of molybdenum, wherein the cement comprises a molybdenum powder and an aluminum nitride powder; and
the total amount of metalloid elements, rare-earth elements and metal elements (except the rare-earth elements and aluminum element) corresponding to the following conditions (1) and (2) is 300 ppm or less:
(1) metal elements having a melting point of 2000° C. or lower, and
(2) metal elements having an ion radius smaller than that of aluminum.

2. The cement according to claim 1, which contains 30 to 70% by weight of the molybdenum powder and 70 to 30% by weight of the aluminum nitride powder, based on 100% by weight of the total amount of the molybdenum powder and the aluminum nitride powder.

3. The cement according to claim 1, wherein the aluminum nitride sintered body constituting the arc tube body has an absorption rate of 10% or less per a thickness of 1 mm of the aluminum nitride sintered body.

4. An arc tube comprising an arc tube body made of a tubular aluminum nitride sintered body and a bar-shaped or tubular electrode support made of molybdenum, in which the arc tube body and the electrode support are bonded through a mixed layer comprising molybdenum and aluminum nitride that is formed from the cement according to claim 1.

5. The arc tube according to claim 4, wherein the aluminum nitride sintered body constituting the arc tube body after the bonding has an absorption rate of 10% or less per a thickness of 1 mm of the aluminum nitride sintered body.

6. A high-pressure discharge lamp which comprises the arc tube according to claim 4.

7. A method for producing an arc tube comprising an arc tube body made of a tubular aluminum nitride sintered body and a bar-shaped or tubular electrode support made of molybdenum, comprising a step in which
a layer comprising the cement according to claim 1 is formed on the inner surface of the arc tube body and/or on the external surface of the electrode support; and
the arc tube body and the electrode support are integrated through the layer(s) comprising the cement.

8. The cement according to claim 2, wherein the aluminum nitride sintered body constituting the arc tube body has an absorption rate of 10% or less per a thickness of 1 mm of the aluminum nitride sintered body.

9. An arc tube comprising an arc tube body made of a tubular aluminum nitride sintered body and a bar-shaped or tubular electrode support made of molybdenum, in which the arc tube body and the electrode support are bonded through a mixed layer comprising molybdenum and aluminum nitride that is formed from the cement according to claim 2.

10. An arc tube comprising an arc tube body made of a tubular aluminum nitride sintered body and a bar-shaped or tubular electrode support made of molybdenum, in which the arc tube body and the electrode support are bonded through a mixed layer comprising molybdenum and aluminum nitride that is formed from the cement according to claim 3.

11. A high-pressure discharge lamp which comprises the arc tube according to claim 5.

12. A method for producing an arc tube comprising an arc tube body made of a tubular aluminum nitride sintered body and a bar-shaped or tubular electrode support made of molybdenum, comprising a step in which
a layer comprising the cement according to claim 2 is formed on the inner surface of the arc tube body and/or on the external surface of the electrode support; and
the arc tube body and the electrode support are integrated through the layer(s) comprising the cement.

13. A method for producing an arc tube comprising an arc tube body made of a tubular aluminum nitride sintered body and a bar-shaped or tubular electrode support made of molybdenum, comprising a step in which
a layer comprising the cement according to claim 3 is formed on the inner surface of the arc tube body and/or on the external surface of the electrode support; and
the arc tube body and the electrode support are integrated through the layer(s) comprising the cement.

* * * * *